United States Patent [19]

Mori et al.

[11] E Patent Number: Re. 33,521

[45] Reissued Date of Patent: Jan. 15, 1991

[54] METHOD AND APPARATUS FOR DETECTING A FAULTY COMPUTER IN A MULTICOMPUTER SYSTEM

[75] Inventors: Kinji Mori, Kawasaki; Hirokazu Ihara, Machida, both of Japan

[73] Assignee: Hitachi, Ltd., Tokyo, Japan

[21] Appl. No.: 938,034

[22] Filed: Dec. 4, 1986

Related U.S. Patent Documents

Reissue of:

[64] Patent No.: 4,486,829
Issued: Dec. 4, 1984
Appl. No.: 363,841
Filed: Mar. 31, 1982

[30] Foreign Application Priority Data

Apr. 3, 1981 [JP] Japan ..... 56-49315

[51] Int. Cl.[5] ..... G06F 11/20; G06F 13/40; G06F 15/16

[52] U.S. Cl. ..... 364/200; 364/265.1; 364/266; 364/268.7; 364/268.9; 364/229.3; 340/825.01; 340/825.05; 370/16.1; 370/85.15; 371/11.1

[58] Field of Search ... 364/200 MS File, 900 MS File; 371/11, 15, 16, 22, 11.1, 11.2, 15.1, 16.1, 16.3; 340/825.01, 825.08, 825.05; 370/16, 85, 86, 88, 85.1, 85.5, 85.12, 16.1, 85.15

[56] References Cited

U.S. PATENT DOCUMENTS

| | | | |
|---|---|---|---|
| 3,876,983 | 4/1975 | Zafiropulo et al. | 371/11 |
| 4,035,770 | 7/1977 | Sarle | 371/11 |
| 4,159,470 | 6/1979 | Strojny et al. | 371/11 |
| 4,270,168 | 5/1981 | Murphy et al. | 364/200 |
| 4,320,508 | 3/1982 | Takezoe | 371/11 |
| 4,354,267 | 10/1982 | Mori et al. | 371/11 |
| 4,356,546 | 10/1982 | Whiteside et al. | 364/200 |
| 4,374,436 | 2/1983 | Armstrong | 371/11 |
| 4,377,000 | 3/1983 | Stabb | 371/11 |
| 4,387,426 | 6/1983 | Roberts | 364/200 |
| 4,402,082 | 8/1983 | Cope | 371/11 |

*Primary Examiner*—Thomas C. Lee
*Attorney, Agent, or Firm*—Antonelli, Terry, Stout & Kraus

[57] ABSTRACT

In a method of controlling a multicomputer system which includes a plurality of computers connected to a common transfer bus, each of the plurality of computers decides whether or not the adjacent computer is abnormal, and the computer which has decided that the adjacent computer is abnormal cuts off this adjacent computer from the transfer bus.

21 Claims, 9 Drawing Sheets

METHOD AND APPARATUS FOR DETECTING A FAULTY COMPUTER IN A MULTICOMPUTER SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a multicomputer system including a plurality of computers connected to a common transmission bus, and also to a transmission control method therefor. More particularly, it relates to a transmission control method in which when a certain computer has been in trouble, it can be electrically separated from the common transmission bus so that the communication of information can be normally performed among the remaining computers.

Heretofore, in a system in which a plurality of computers are coupled by a transmission bus, it has been the practice to connect the respective computers directly to the transmission bus and to transmit and receive the potential changes of the transmission bus as information.

In such system, when one computer transmits data, it occupies the transmission bus. Therefore, when a certain computer has been in trouble while occupying the transmission bus, disadvantageously the other computers are prevented from using the transmission bus permanently, resulting in the whole system being disabled.

SUMMARY OF THE INVENTION

The present invention has been made in order to solve the disadvantage of the prior art, and has for its object to provide a transmission control method in which even when a computer using a transmission line for data communication has caused a fault or trouble of some kind, the fault is detected by another computer, and the faulty computer is separated from the transmission bus, whereby the disabling of the whole system can be prevented.

A feature of the present invention is that, in a multicomputer system having a plurality of computers, there are provided a common transmission bus, gate means connected between the respective computers and the common transmission bus, and control lines for connecting the respectively adjacent computers in such a manner that a closed loop which includes the two computers, the control line and the common transmission bus may be used for detecting any fault of the computers.

Another feature of the present invention is that a fault in the system is detected by sensing whether or not the period of time in which predetermined data delivered from any desired first computer reaches a second computer is longer than a predetermined time, and that when the fault has been detected, a gate circuit is controlled so as to prevent data from being delivered from the first computer.

Still another feature of the present invention is that, when any fault has been detected in the system, a faulty computer is detected by check signals generated to flow through a large number of closed loops each of which consists of two adjacent computers, the common transmission bus and the control line, and that the faulty computer is electrically separated from the common transmission bus.

DETAILED DESCRIPTION OF THE PREFERRED EMBODIMENTS

Figure 1:
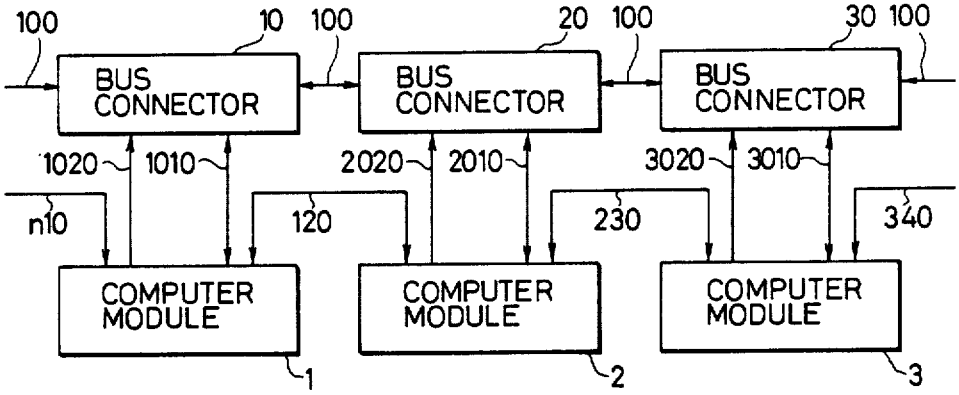
FIG. 1 is a block diagram showing the arrangement of a multicomputer system according to the present invention.

Hereunder, the present invention will be described in detail in conjunction with various embodiments. FIG. 1 is a block diagram of the whole system of the first embodiment. Computer modules 1, 2 and 3 are interconnected by bidirectional signal lines 1010, 2010 and 3010, bus connectors (BC) 10, 20 and 30, and a transmission bus 100. The adjacent computer modules are respectively connected by bidirectoinal control lines n10, 120, 230 and 340 for transferring control signals. Further, control lines 1020, 2020 and 3020 connect the respective computer modules with the corresponding bus connectors.

Figure 2:
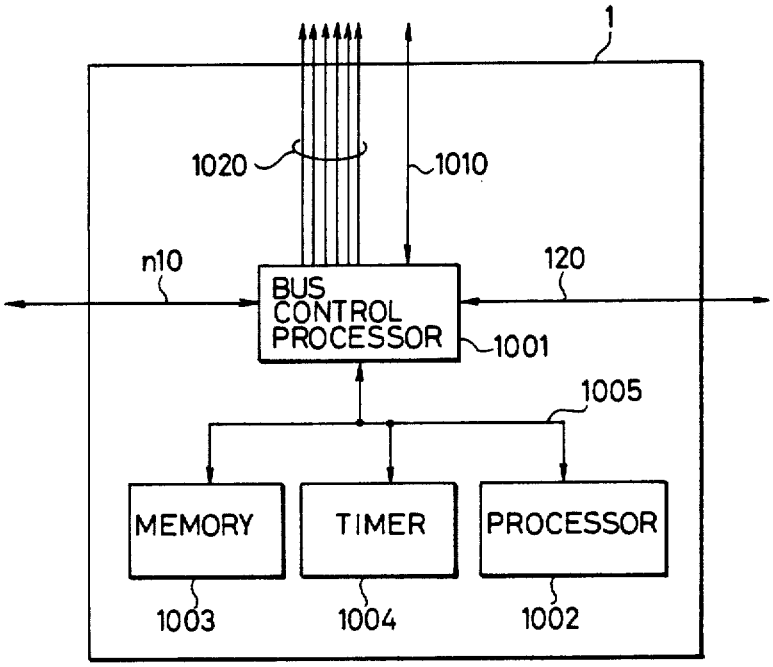
FIG. 2 is a diagram showing the arrangement of one computer module in FIG. 1.
Figure 5:
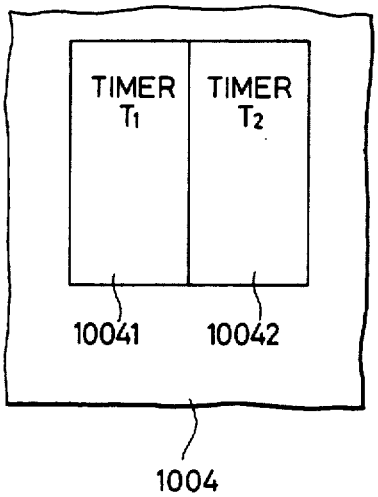
FIG. 5 is a diagram for explaining a timer in FIG. 1.
Figure 6:
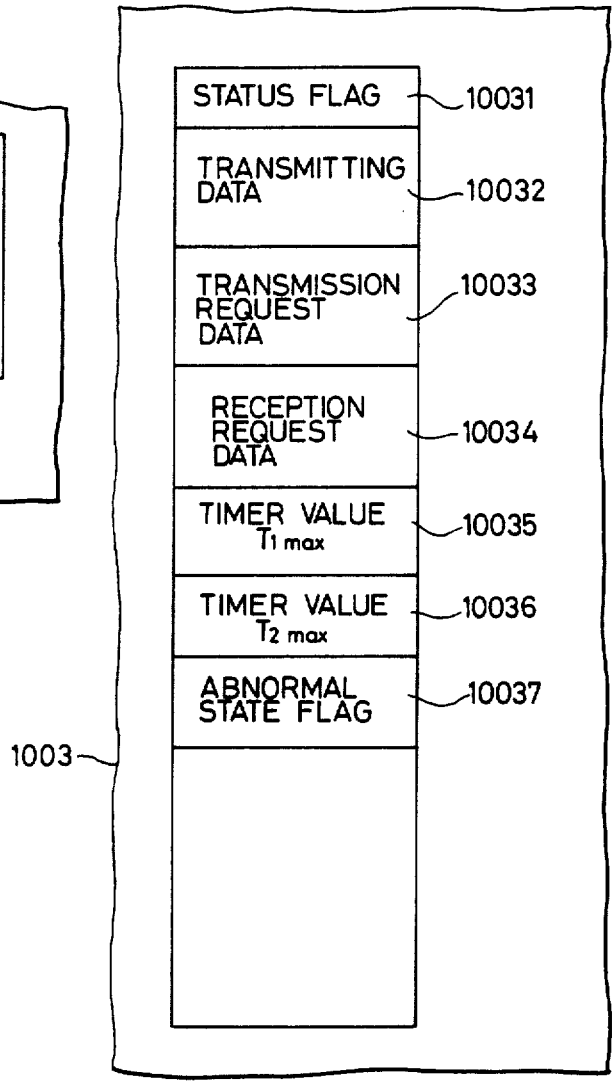
FIG. 6 is a diagram for explaining a memory in FIG. 1.

FIG. 2 shows the arrangement of the computer module 1. The arrangements of the other modules 2 and 3 are the same. Referring to the figure, the computer module 1 is comprised of a bus control processor (BCP) 1001, a memory 1003, a timer 1004, a processor 1002 and a [biderectional] *bidirectional* transmission line 1005. The bus control processor (BCP) 1001 controls the transmission of data and senses and processes any fault on the transmission bus. The aforementioned bus control processor, per se, has been known. As shown in FIG. 6, the memory 1003 has a status flag area 10031, a transmission data area 10032, a transmission request data area 10033, a reception data area 10034, timer value areas 10035 and 10036, and a fault flag area 10037. As shown in FIG. 5, the timer 1004 has areas 10041 and 10042 in which two timer values $T_1$ and $T_2$ are set.

TRANSMISSION AND RECEPTION OF DATA

Now, when the computer module 1 has data to be transmitted, the processor (MPU) 1002 within this module 1 informs the BCP 1001 of a transmission request through the internal bus 1005. Unless the bus 100 is occupied, the BCP 1001 sets a transmission status as the status flag in the memory area 10031 shown in FIG. 6. Thereafter the BCP 1001 issues a data delivery instruction to the BC 10 through the control line 1020 so as to bring this BC 10 into a status (to be described later) in which data can be delivered from the module 1 onto the bus 100. Subsequently, the BCP 1001 sends transmission request data $r_1$ onto the bus 100 through the data line 1010 as well as the BP 10. On the other hand, the BCPs of the computer modules 2 and 3 are set in statuses capable of accepting data on the bus at all times, that is, they have their status flags indicative of reception waiting statuses. They receive the transmission request data $r_1$ on the bus, and write it into memory areas 20034 and 30034 (which correspond to the memory area 10034 and which are not shown) in the respective modules 2 and 3. When transmission request data $r_1$ and $r_1'$ have been simultaneously delivered from a plurality of modules, each module receives the superposed transmission request data $r_1$ and $r_1'$, and each selects one of the modules to be given the right of data transmission, according to the priority decision algorithm. The priority decision algorithms of the respective BCPs are the same as each other so that the same module can be selected to have the transmission right. Of course, when the transmission request data is delivered from only one module, this module acquires the right of transmission. Such priority decision processing for giving the transmission right to one module, per se, has been known. On the other hand, in a case where, when the module 1 has data to be transmitted, the bus 100 is already being used by another module and the status flag (FIG. 6) of the memory area 10031 is indicative of a reception status, the BCP 1001 stores the data to be transmitted into the memory area 10032 of the memory 1003 in order. When the use of the bus 100 by the other module has ended, the status flag of the memory area 10031 turns from the reception status into the reception waiting status. Then, the BCP 1001 immediately delivers the transmission request data as in the foregoing.

In no time, the BCPs of the module having delivered the transmission request data and the module having received the same set the fault monitor timers 10041. The timer 10041 serves to monitor the function of the module having acquired the transmission right, and will be described in detail later.

The BCP 1001 of the module having acquired the transmission right reads out the transmission data in the memory area 10032 successively and delivers it onto the transmission bus 100 through the data line 1010 as well as the BC 10. On the other hand, the BCPs 1001 of all the other modules write the data sent from the data line 1010, into the reception data storage areas 10034 of the memories 1003 through the BCs 10 and the transmission bus 100. The BCP 1001 which has terminated the transmission of the data sends an end flag data to the transmission bus 100. The BCP 1001 which has terminated the transmission of the data sends an end flag data to the transmission bus 100. Simultaneously the BCP 1001 sets the status flag indicative of waiting for the data reception and informs the MPU 1002 of the end of the data delivery. The MPU 1002 clears the stored data of the memory area 10032.

Figure 3:
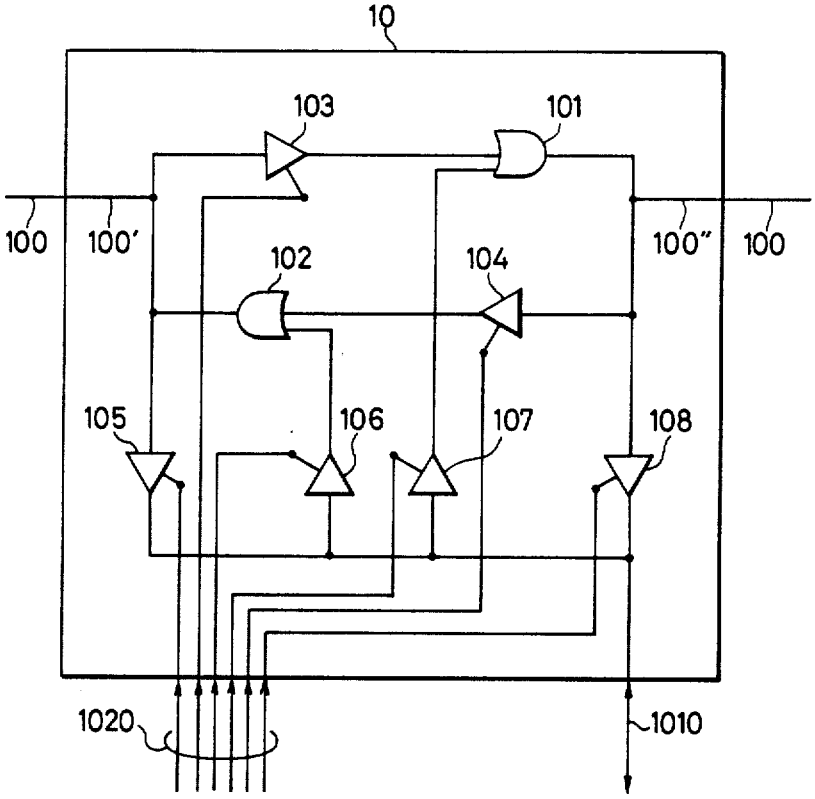
FIG. 3 is a diagram showing the connection of a bus connector in FIG. 1.

In transmitting and receiving data, the BCP 1001 controls the BC 10 in FIG. 3 through the control lines 1020, as stated below. When the module 1 has been in the reception waiting status, that is, when the status flag of the memory area 10031 has been set into the reception waiting status, the BCP 1001 brings gate circuits 106 and 107 in the BC 10 into nonconductive states (hereinbelow, termed "OFF states") and gate circuits 103, 104, 105 and 108 into conductive states (hereinbelow, termed "ON states") through the control lines 1020, thereby to set the BC 10 into the status in which the data on the transmission bus 100 can be accepted. When the transmission status has been established, the BCP 1001 turns ON the gate circuits 106 and 107 and turns OFF the others. In addition, in case the status flag of the memory area 10031 has been set into the reception status, the gates of the BC 10 are controlled as in the reception waiting status.

DETECTION OF FAULT

It is designed in advance that the module i having gained the transmission right (hereinbelow referred to as the transmitting module) terminates the data transmission within a certain value $T_{1\ max}$ set by the timer 10041. For this reason, the quantity of data in one transmission is limited within a predetermined range, and also the quantity of data of one message is set in advance to become at most a predetermined amount. On the other hand, when the other modules j (hereinunder referred to as the receiving modules) have received no end flag data from the transmitting module through the transmission bus 100 within the predetermined time $T_{1\ max}$ set by the timer 10041, they automatically set in the memory areas 10031 of their own memory the status flags indicative of fault statuses and regard the transmitting module i as having become disabled.

ELECTRICAL SEPARATION OF FAULTY MODULE

Figure 4:
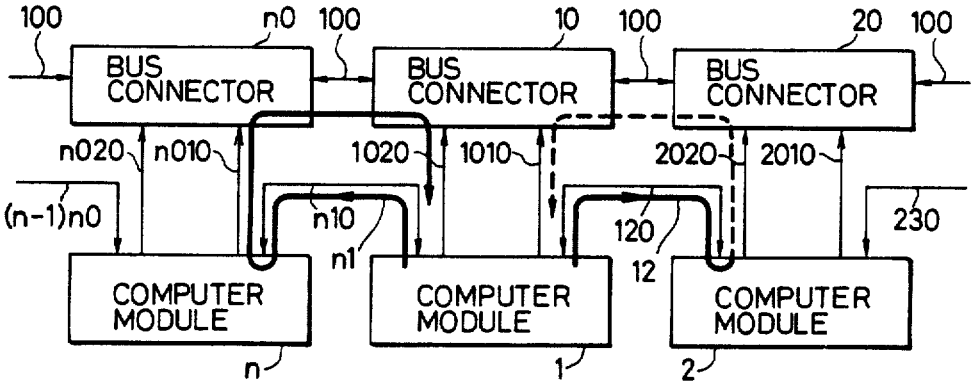
FIG. 4 is a diagram for explaining the operation of the multicomputer system according to the present invention.

The processing relating to the detected fault of the transmitting module i is described below. Referring now to FIG. 4, it is supposed that i=2, i.e., that the transmitting module is the module 2, and that the module 2 has become faulty. When the module 2 has terminated its delivery of data on the transmission line due to faulty condition, the other modules deem the transmission right of the module 2 to have been released and set the status flags of their own memory into the reception waiting statuses. Then, the other one of the modules can get the transmission right and transmit data onto the transission bus in the manner described before. Whether or not the faulty module 2 continues to deliver data is checked by the BCPs of the respective modules. However, when the module 2 has become disabled while continuing to deliver data, the other modules cannot use the bus 100 because the module 2 occupies the bus. Therefore, when the value of the timer 10041 in FIG. 5 has become the predetermined value $T_{1\ max}$, the BCP 1001 of the module 1 first provides signals to turn OFF the gate circuits 103, 104, 106, 107 and 108 and to turn ON only the gate circuit 105, through the control lines 1020. Thus, any data from the module 2 is prevented from flowing through the transmission bus 100 toward the module 1 and the module n. Thereafter, the BCP 1001 delivers a minor loop check signal n1 (refer to FIG. 4) through the control line n10 and simultaneously sets the timer 10042 at a predetermined value $T_{2\ max}$. The BCP of the module n having accepted the minor loop check signal n1 stores it into the memory area n0034 and thereafter delivers signals to turn ON only the gate circuit 107 of the BC n0 and to turn OFF the others, through the control lines n020. Thereafter, the minor loop check signal n1 issued by the module 1 and stored in the memory area n0034 is sent to the BC 10 through the data line n010, the BC n0 and the transmission bus 100. The BC 10 has already been set so as to accept data from the module n, so that the minor loop check signal n1 makes a round to return to the module 1. The module 1 regards the adjacent module n as being normal, on the ground that the minor loop check signal n1 has been returned from the module n before the value of the timer 10042 becomes $T_{2\,max}$. Subsequently, in order to check if the adjacent module 2 on the opposite side is normal, the BCP 1001 of the module 1 issues a minor loop check signal 12 similarly to the foregoing. Since, in this case, the module 2 is in trouble, the minor loop check signal 12 does not return to the module 1. The module 1 regards the adjacent module 2 as being disabled because the minor loop check signal 12 does not return thereto within the perior of time $T_{2\,max}$ set by the timer 10042. Therefore, the BCP 1001 turns OFF the gate circuits 104 and 108 so that any data from the module 2 may not flow through the transmission bus toward the module 1 and the module n. Besides, the module 1 sets the fault flag indicative of the down condition of the module 2 into the memory area 10037. In the manner thus described, all the modules 1, 3, . . . perform the minor loop check after the period of time $T_{1\,max}$ set by the timer 10041. Therefore, the module which adjoins the module having been down can sense the fault of the latter module and electrically separate the latter module from the bus. The other modules which are normal can continue the data communication.

RECOVERY OF FAULTY MODULE

When the module adjoining the faulty module has thereafter received the minor loop check signal from the module which had been in trouble, it changes a status flag of the faulty module from the fault status into the reception waiting status and resets the timer 10042.

When the module 2 has recovered from its faulty condition, it delivers the minor loop check signals to both the adjacent modules 1 and 3 through the respective control lines 120 and 230. The minor loop check signals are processed within the modules 1 and 3 in the same manner as in the foregoing. On the ground that the minor loop check signals have been sent from the module 2, the modules 1 and 3 regard the module 2 as having recovered and reset the fault flag stored in the memory area 10037 of the module 2. Then, they restore the gate circuits of the BCs 10 and 30 into the normal states, stop keeping the gate circuits 104 and 108 OFF at all times so that the module 2 can transmit data into the transmission bus 100.

According to the present invention, the computers connected to the transmission bus sense the faulty condition of another computer which is transmitting the data and electrically separate the faulty computer from the transmission bus, whereby a disabling of the whole system can be avoided.

Figure 7:
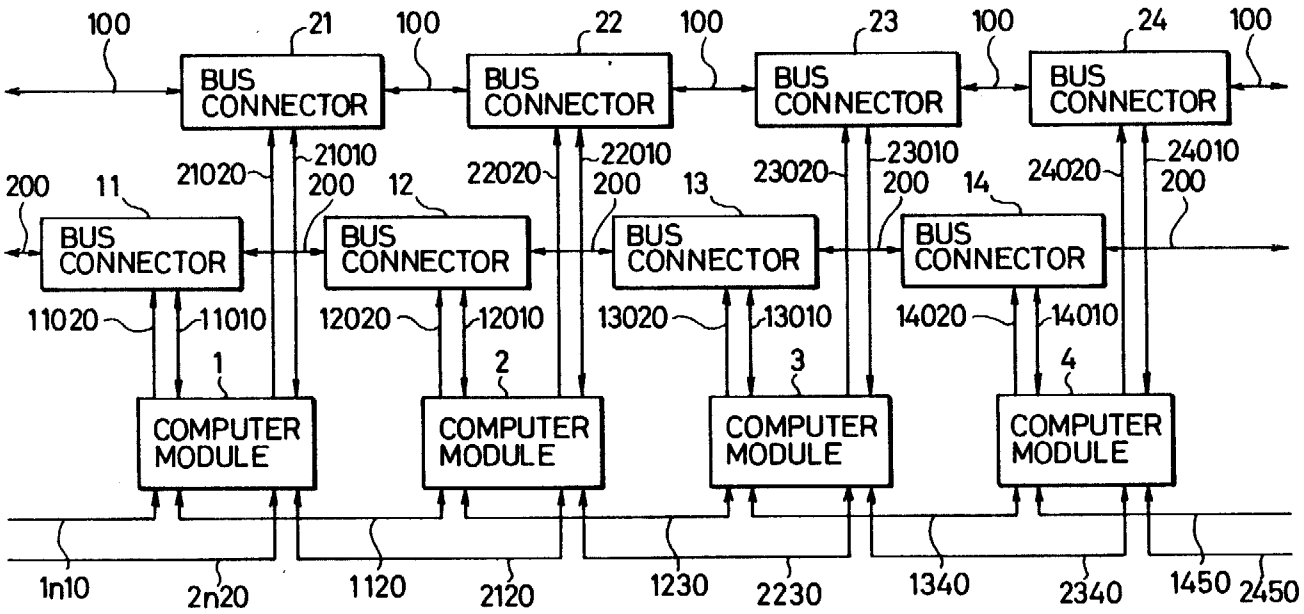
FIG. 7 is a block diagram showing another embodiment of the multicomputer system according to the present invention.

FIG. 7 is the general block diagram for explaining the second embodiment of the present invention. Computer modules 1–4 are connected to double transmission buses 100 and 200 through bus connectors 11–14 and 21–24. Between the bus connectors and the computer modules, there are connected data lines 11010, 12010, 13010, 14010, 21010, 22010, 23010 and 24010 for the data transmission, and control lines, 11020, 12020, 13020, 14020, 21020, 22020, 23020 and 24020 for passing control signals. Between the respectively adjacent computer modules, there are connected control lines 1n10, 1120, 1230, 1340, 2n10, 2120, 2230 and 2340 which are used to exchange control signals between them.

Figure 8:
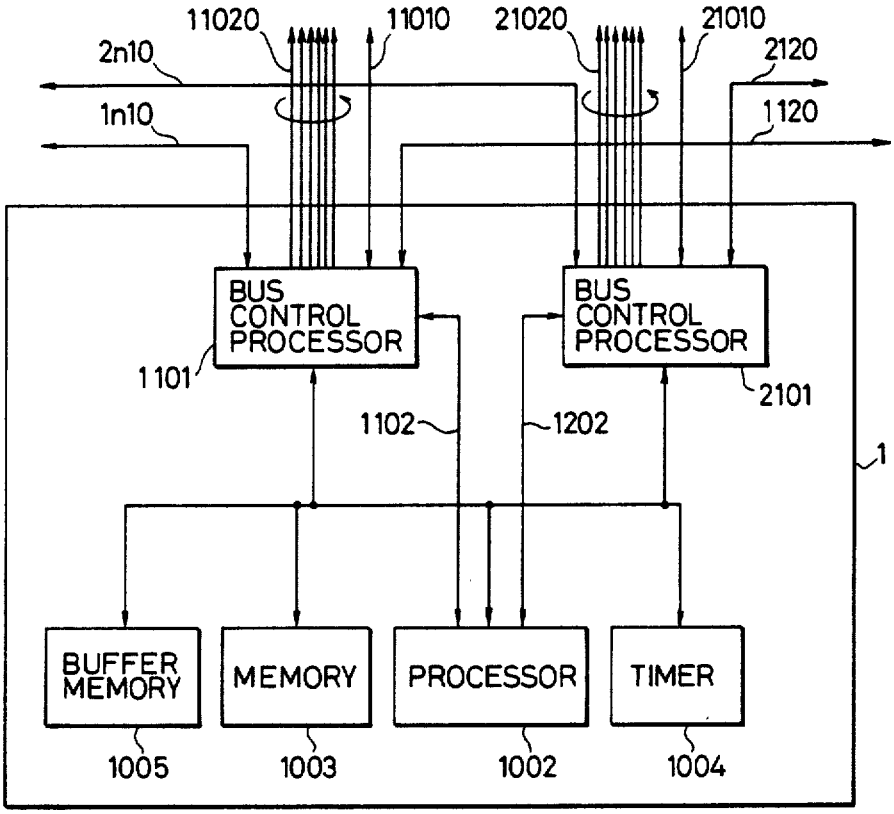
FIG. 8 is a diagram showing the arrangement of one computer module in FIG. 7.
Figure 12:
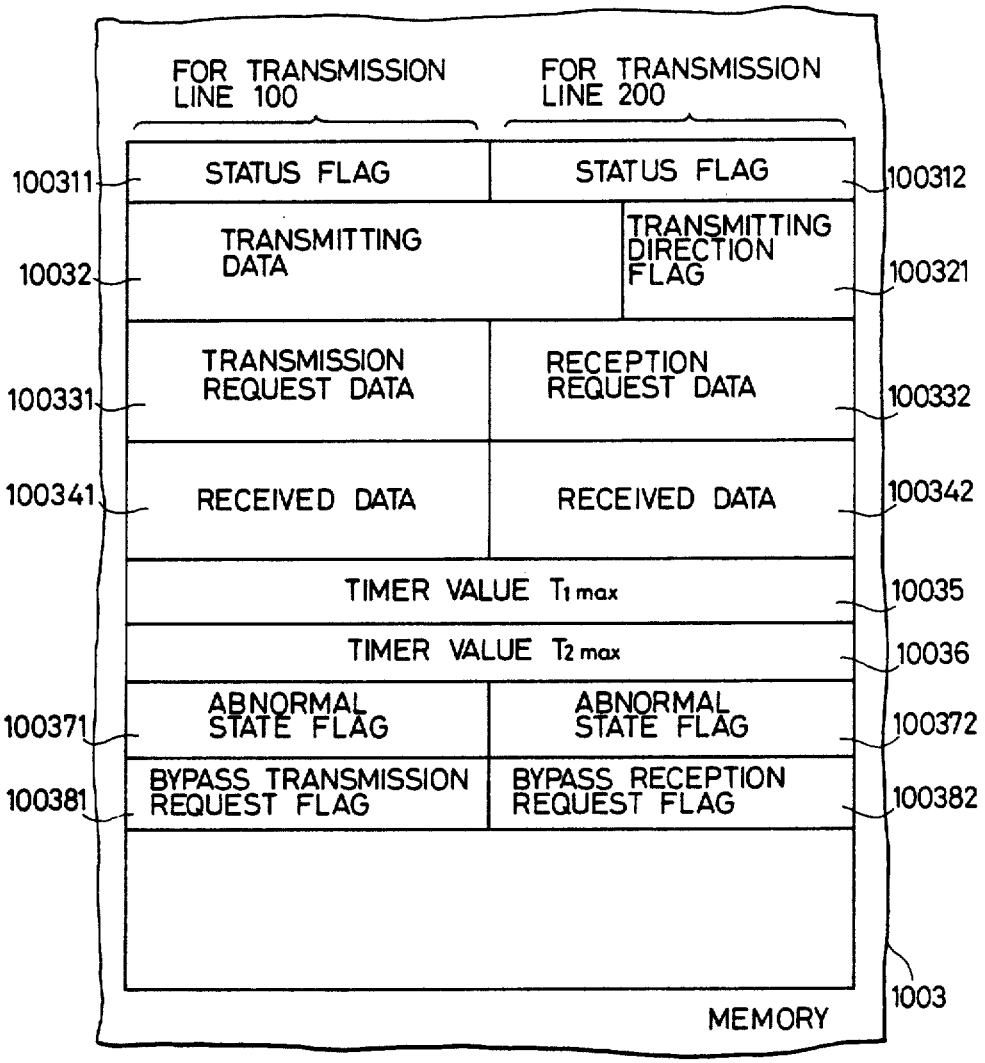
FIG. 12 is a diagram for explaining a memory in FIG. 7.

The computer module 1 will be in a reception waiting status upon closure of a power supply switch. The status flags 100311 and 100312 of its internal memory 1003 are initially set to indicate the reception waiting status as shown in FIG. 12. When data to be transmitted has been generated in the computer module 1 and has been stored in a memory area 10032, an MEU 1002 shown in FIG. 8 determines whether the data are to be delivered through the transmission bus 100 or 200, and it sets a transmitting direction flag 100321 for the data. Herein, when the status flag 100311 (or 100312) is in the reception waiting status, the corresponding transmission bus 100 (or 200) can be used for data transmission. When both flags are in the reception waiting status the MPU 1002 uses the transmission buses 100 and 200 alternately.

When the data to be transmitted has been generated in the computer module 1, a BCP 1101 or 2101 sets the status flag 100311 or 100312 indicative of a transmission status. Then the computer module 1 delivers a transmission request signal onto either the transmission bus 100 or 200. The computer modules having accepted the transmission request signal store the same into the areas 100331 or 100332 of their internal memories 1003. When each module receives a plurality of the transmission request signals, each determines only one computer module to be given the transmission right in accordance with a predetermined priority decision algorithm. Here, since all the priority decision routines in the respective computer modules are the same, only one computer module is selected to have the transmission right by the respective modules. These processings are executed by that bus control processor (BCP) 1101 or 2101 in the computer module 1 which has accepted the transmission request signals. When the data to be transmitted has been generated in the computer module 1 and has been stored into the memory area 10032, the processor (MPU) 1002 determines the use of either the transmission bus 100 or the transmission bus 200 for the data transmission and sets the transmitting direction flag 100321 in correspondence with the data. Thereafter, the MPU 1002 informs either BCP 1101 or BCP 2101 depending upon the use of the transmission bus, of the transmission request through the control line 1102 or 1202. Assuming now that the transmission bus 100 is selected to be used and that the BCP 1101 has acquired the transmission right through the priority decision process stated before, the BCP 1101 informs the MPU 1002 of those results. The MPU 1002 transmits the predetermined data from the memory 1003 through the BCP 1101 and the transfer bus 100. When all the predetermined data has been transmitted, the MPU transmits termination data, and then sets the reception waiting flag and erases the transmitted data 10032 as well as the transmitting direction flag 100321.

Figure 9:
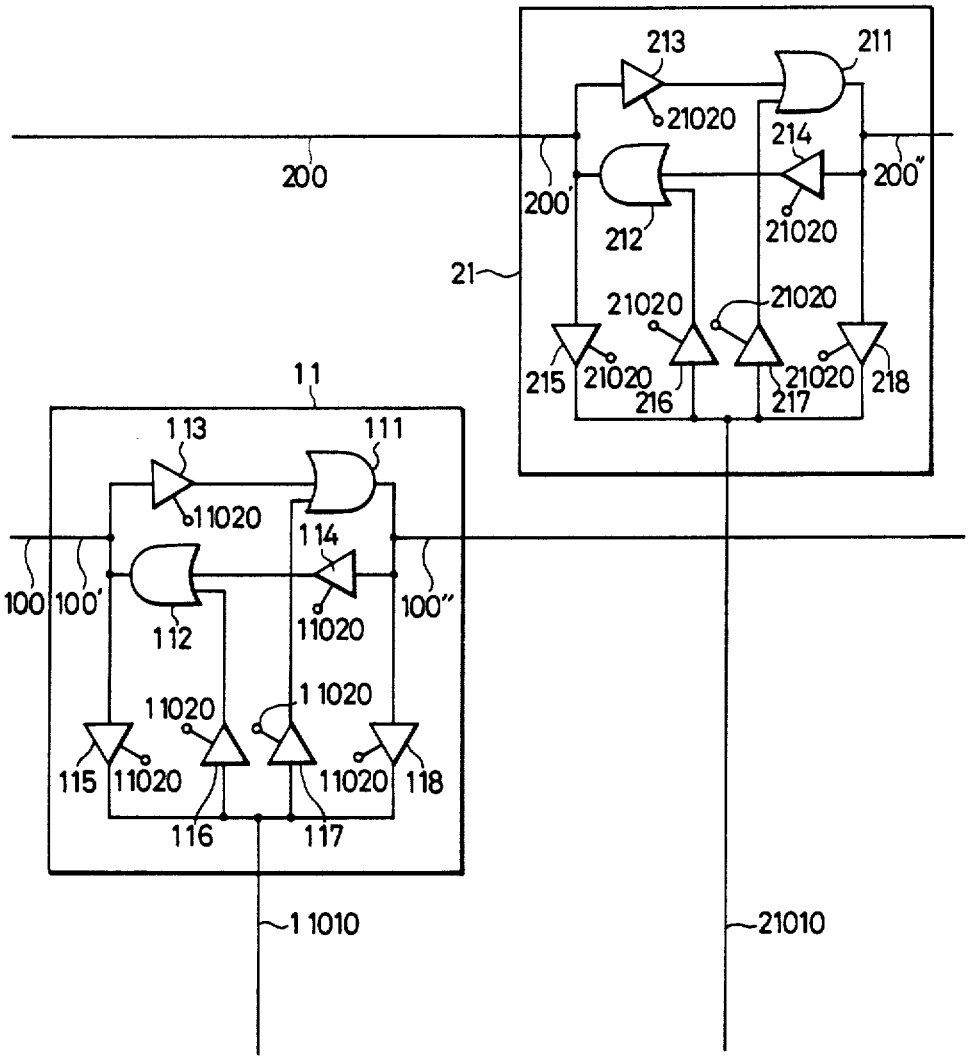
FIG. 9 is a diagram showing the arrangements of bus connectors in FIG. 7.
Figure 11:
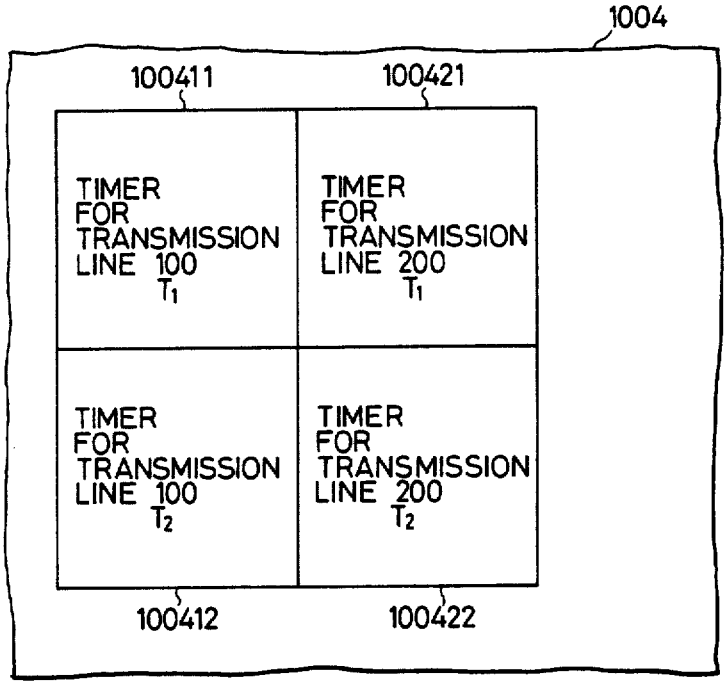
FIG. 11 is a diagram for explaining a timer in FIG. 7.

When the BCP 1101 has not obtained the transmission right, it resets the data transmitting direction flag 100321. If another module has already had the transmission right and is using the transmission bus 100, the BCP 1101 sets the status flag 10041 for the transmission bus 100 into the mode of reception waiting and operates the timer $T_1$ 100411 shown in FIG. 11 so as to start counting of the bus occupying period of time. The timer $T_1$ 100411 is reset when the end flag data has been received. If the value of the timer $T_1$ 100411 has become greater than a predetermined value $T_{1\ max}$ before the receipt of the end flag data, the BCP 1101 determines that the BCP having gained the transmission right has become disabled, and it resets the timer $T_1$ 100411. Herein, however, the BCP 1101 does not know which module has obtained the transmission right. Therefore, the BCP 1101 sets the status flag 100311 indicative of the fault. It sends minor loop check signals via the control lines 1n10 and 1120 to the adjacent modules n and 2 connected to the transmission bus 100, and sets a minor loop check-monitor timer $T_2$ 100412. If the minor loop check signal does not flow back from the BCP of the adjacent module 2 within $T_{2\ max}$, the BCP 1101 deems the adjacent module 2 to have been disabled and resets the minor loop check-monitor timer $T_2$ 100412. When the minor loop check signal has returned, the BCP 1101 deems the adjacent module 2 to be normal and resets the minor loop check-monitoring timer $T_2$ 100412. In addition, it changes the status flag 100311 into the reception waiting status. Here, if the module 2 which has been in trouble continues to deliver data, the BCP 1101 having checked the fault of the adjacent module 2 instructs the bus connector 11 to cut off the transmission through the bus 100'' (refer to FIG. 9) toward the module 2, and it sets a fault flag 100371 (refer to FIG. 12) indicating that the direction toward the module 2 is faulty.

Since the transmission through the transmission bus 100 toward the module 2 is cut off, the module 1 uses a bypass when it receives data through the transmission bus 100 leading to the module n, as described below.

Figure 13:
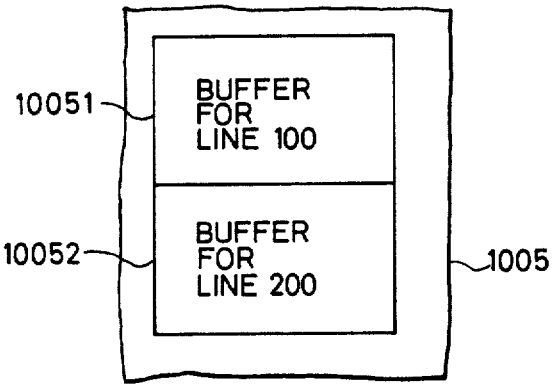
FIG. 13 is a diagram showing the arrangement of the line buffers.

When the BCP 1101 having set the fault flag 100371 indicating that the direction toward the module 2 is down is supplied with the data from the transmission bus 100' leading to the module n, this BCP 1101 stores the data into the area 10051 of a buffer 1005 for bypass as shown in FIG. 13. When the data has been stored into the buffer area 10051, the MPU 1002 sets a bypass transmission request flag 100381.

When the bypass transmission request flag 100381 has been set, the MPU 1002 instructs the BCP 2101 to transmit onto the bus 200 the data of the buffer area 10051 which stores the data received through the transmission bus 100. When the status flag 100312 for the transmission bus 200 indicates the reception waiting status, the BCP 2101 changes it into a reception status. Thereafter, the BCP operates the timer $T_1$ 100421 and issues a transmission request data so as to perform a series of processings for obtaining the right of transmission. The processings are the same as in the normal mode. When the BCP 2101 has gained the transmission right, the MPU 1002 executes the following control in order to deliver through the transmission bus 200 the data which has been received in the direction of the transmission bus 100 leading to the module n and which is stored in the buffer area 10051. In sending the data toward the module n, however, it need not be passed through the transmission bus 200. The MPU 1002 instructs the BCP 2101 to transfer the data to the buffer area 10051. When the BCP 2101 has been requested by the MPU 1002 to transmit onto the transmission bus 200 the data stored in the buffer area 10051 as received through the transmission bus 100, it checks the fault flag 100371. When the BCP 2101 determines from the fault flag 100371 that the transmission toward the module n is impossible, it instructs the BC 21 to deliver the data only toward the module 2 through the transmission bus 200. This is realized in such a way that the BCP 2101 turns OFF gate circuits 216, 213 and 215 (in FIG. 9) through the control line 21020. Thereafter, the BCP 2101 delivers the data in the buffer area 10051 in the same manner as in the normal mode. When all the data has been delivered, it delivers an end flag data, sets the status flag 100312 into the reception waiting status, returns the BC 21 into the normal status and resets the monitor timer 100421. In addition, the BCP 2101 informs the MPU 1002 of the termination of the data transmission. The MPU 1002 clears the stored data of the buffer area 10051. At this time, the MPU 1002 resets the bypass transmission request flag 100381 when all the data in the buffer area 10051 has been delivered. As long as the bypass transmission request flag is held set and data exists in the buffer area 10051, the MPU 1002 delivers the data through the transmission bus 200 in the same manner as described above. During the transmission of the data from the BCP 2101, all the other BCPs connected to the transmission bus 200 are monitoring any fault with the respective monitor timers $T_1$. The processings performed in the modules for sensing the fault are the same as in the foregoing. The processings performed in the receiving BCPs are carried out irrespective of whether the data is bypassed or not.

Figure 10:
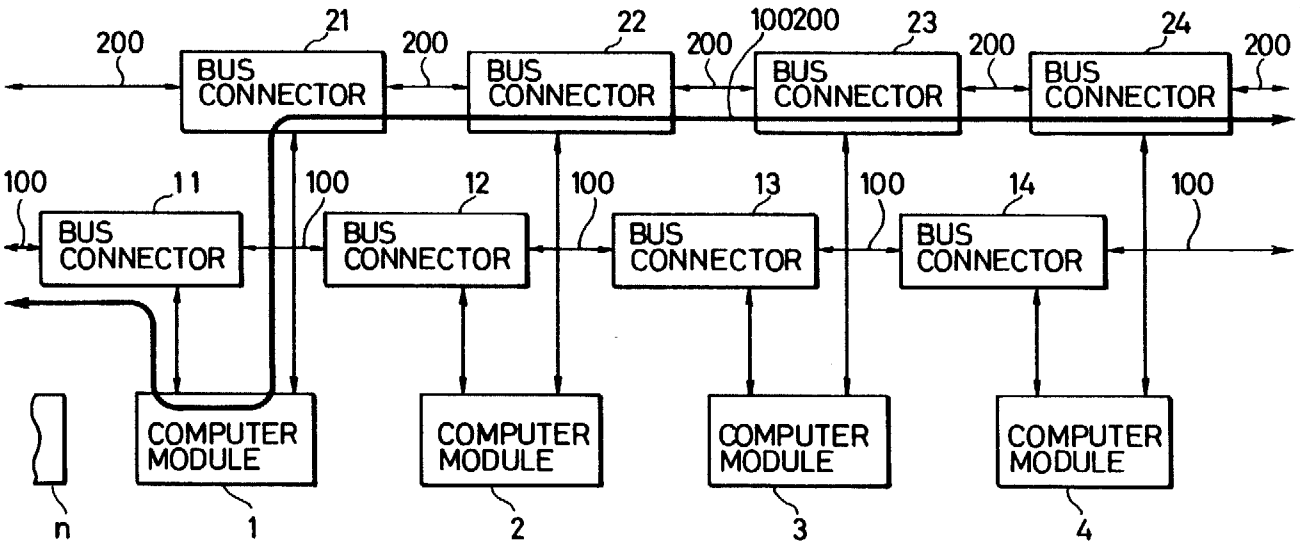
FIG. 10 is a diagram for explaining the operation of the embodiment shown in FIG. 7.

From the foregoing, the transmission using the bypass 100200 as shown in FIG. 10 will become apparent. Now, it can occur in each module that data is received simultaneously from the two transmission buses 100 and 200 or that data is transmitted through one transmission bus and received through the other. The control therefor is as stated below.

When the transmission and reception are simultaneously executed through the transmission buses 100 and 200 respectively, the MPU 1002 applies a reception permission signal and a transmission permission signal to the BCPs 1101 and 2101 respectively on a time sharing basis. Upon receiving the reception permission signal from the MPU 1002, the BCP 1101 turns ON gate circuits 113, 114, 115 and 118 and turns OFF gate circuits 116 and 117 in the BC 11 of FIG. 9 through the control lines 11020, and it turns OFF the gate circuits 113, 114, 115 and 118 after a predetermined time $T_3$. Upon receiving the transmission permission signal, it turns ON the gate circuits 116, 117, 113 and 114 and turns OFF the gate circuits 115 and 118 in the BC 11 through the control lines 11020, and it turns OFF the gate circuits 116 and 117 after the predetermined time $T_3$. The period $T_0$ in which the MPU 1002 grants the BCPs 1101 and 2101 the transmission or reception permission is equal to the time interval during which the delivery of data continues when the respective modules deliver the same data, and the time $T_3$ is selected in advance so as to become:

$$2T_3 < T_0$$

Thus, the respective modules can transmit and receive data by using the transmission buses on a time sharing basis.

According to the present invention, it has become possible to provide a control system and apparatus which can sense any fault of the computers connected to the double transmission buses. Each computer can continue the data communication as in the normal mode even when it does not know the statuses of all the other computers.

We claim:

1. A multicomputer system comprising:

(a) first and second computers, each of which includes a processor for controlling transmission and reception of data, and a memory for storing data received and to be transmitted;

(b) a common transmission bus;

(c) first and second bus connector means, which are respectively connected to one of said first and second computers and to said common transmission bus and each of which includes gate means for selectively passing a signal to the corresponding computer from said common transmission bus and a signal to be delivered from said corresponding computer to said common transmission bus;

(d) means including at least one first connection line for transmitting data or control signals and which connects said first computer with said first bus connector means;

(e) means including at least one second connection line for transmitting data or control signals and which connects said second computer with said second bus connector means, said gate means in each of said first and second bus connector means being controlled by control signals which are applied from the respective computers to said bus connector means through the respective first and second connection lines, and data delivered from said first computer being transmitted to said second computer through said first connection line, said first bus connector means, said common transmission bus, said second bus connector means and said second connection line;

(f) a third connection line which connects said first computer with said second computer; and (g) means for transmitting a signal for checking the operative condition of said first and second computers along a closed loop which includes said first computer, said third connection line, said second computer, said second connection line, said second bus connector means, said common transmission bus, said first bus connector means and said first connection line.

2. A multicomputer system according to claim 1, wherein said memory of said each computer has an area for storing a status flag, and said gate means of each bus connector means is controlled by a control signal corresponding to said status flag.

3. A multicomputer system according to claim 1, wherein said memory of said each computer has an area for storing a value corresponding to a predetermined time period, said each computer further includes first timer means for counting a *determined lapse* period of time from the reception of a transmission request signal *from another computer*, and means for sensing a fault in the *other* computer on the basis of a comparison between an output of said first timer means and said value corresponding to the predetermined time period.

4. A multicomputer system according to claim 1, wherein said memory of each computer has an area for storing a value corresponding to a predetermined time, and each computer further includes first timer means for counting a time interval from the time that predetermined data is delivered onto said connection line to the time that the data returns back to the same computer, and means for controlling said gate means of each bus connector so that, when an output of said timer means has become greater than the value stored in said area of said memory, no data may be delivered from the particular computer to said common data transmission bus.

5. A multicomputer system according to claim 1, wherein said memory of each computer has an area for storing a value corresponding to a predetermined time, and each computer further includes second timer means for counting a time interval from the time that the signal is delivered to said third connection line of said closed loop to the time that the signal returns back to the same computer, and means for controlling said gate means of said each bus connector so that, when an output of said timer means has become greater than the value stored in said area of said memory, no data may enter the particular computer from at least one direction of said common data transmission bus.

6. A multicomputer system comprising:

(a) first and second data transmission buses;

(b) a plurality of computers, each of which includes first and second processors for controlling transmission and reception of data, and a memory for storing data received and to be transmitted;

(c) a group of first bus connector means which are connected respectively to said plurality of computers and to said first data transmission bus, and each of which includes first gate means for controlling passage of data to said first processor of one of said computers from said first data transmission bus and data to be delivered from said first processor to said first data transmission bus;

(d) a group of second bus connector means which are connected respectively to said plurality of computers and to said second data transmission bus, and each of which includes second gate means for controlling passage of data to said second processor of one of said computers from said second data transmission bus and data to be delivered from said second processor to said second data transmission bus;

(e) means including at least one first connection line for transmitting said data or control signals and which connects said first bus connector means with said first processor of one of said computers;

(f) means including at least one second connection line for transmitting said data or control signals and which connects said second bus connector means with said second processor of one of said computers;

(g) a plurality of third connection lines each of which connects a respective first processor of one of said computers with a first processor of another computer;

(h) a plurality of fourth connection lines each of which connects a respective second processor of one of said computers with a second processor of another computer; and (i) means forming first and second closed loops for checking the operative condition of a computer, each first closed loop including the first processors of two of said computers and the first bus connector means and third connection lines connected to the respective processors, each second closed loop including the second processors of two of said computers and the second bus connector means and fourth connection lines connected to the respective processors.

7. A multicomputer system according to claim 6, wherein said memory of each computer has an area for storing a transfer direction flag, and means for controlling said first gate means or second gate means so as to deliver data from the computer to said first data transmission bus or second data transmission bus in correspondence with said flag.

8. A multicomputer system according to claim 6, wherein said memory of said each computer has a data buffer area, and data received through said first connection line is stored in said area and is thereafter delivered from the computer through said second connection line.

9. In a multicomputer system including a plurality of computers each of which has a processor for controlling transmission and reception of data and a memory which stores data received and to be transmitted, a common transmission bus, gate means which is connected between each computer and said common transmission bus, and a connection line which connects [the] respective adjacent computers; a transmission control method comprising the steps of: counting, *in each computer*, a time interval in which predetermined data delivered from [any desired one of said computers reaches another] *that computer returns from an adjacent* computer; controlling, *in each computer*, said gate means when said time interval is greater than a predetermined time, so that no data may be delivered from said [one] *adjacent* computer to said common transmission bus; delivering, *in each computer*, a fault check signal from [one of said computers] *its own computer* to the adjacent computer through said connection line; counting, *in each computer*, a time interval in which the delivered fault check signal returns to [the original] *its own* computer through the adjacent computer, said common transmission bus and said gate means; and controlling, *in each computer*, said gate means connected [between] *to* said common transmission bus [and the computer which has delivered said fault check signal], so as to be in [the] *a* cut off state when said time interval is greater than a predetermined time.

*10. A data transmission system comprising:*

*at least one transmission medium; and*

*a plurality of equipments which are connected to said transmission medium and each of which has (A) connector means connected through said transmission medium to other equipments and including at least one gate means for selectively passing a signal from one of the equipments to another one and, (B) processing means connected to said connector means and including (B1) means for checking a condition of a path including at least one of said other equipments and said transmission medium connected thereto to detect a fault in the path at any time independently of operations of and in parallel with other equipments and (B2) means responsive to said checking means for controlling said gate means of said connector means independently of other equipments so as to prevent said signal from passing through at least one of said gate means when a fault is detected as a result of the checking by said checking means.*

*11. A data transmission system according to claim 10 in which said gate means includes means for selectively receiving a signal from one of said other equipments and said controlling means includes means for controlling said gate means of said connector means so as to prevent said signal from being received when a fault is detected as a result of the checking by said checking means.*

*12. A data transmission system according to claim 10 or 11 wherein, a plurality of transmission mediums are connected to each of said plurality of equipments and in which said gate means includes means for selectively transmitting data to said transmission mediums and said processing means includes means for controlling said gate means so that, when the fault of a path including one of said plurality of transmission medium is detected as a result of the checking by said checking means, said signal is transmitted to another one of said plurality of transmission mediums.*

*13. A data transmission system according to claim 10 in which said means for checking delivers a loop check message which passes a loop which comprises said one of other equipments and said transmission medium connected thereto and returns back to said means for checking.*

*14. A method of controlling a multicomputer system having first and second computers, each of which includes a processor for controlling transmission and reception of data, and a memory for storing data received and to be transmitted; a common transmission bus; first and second bus connector means, which are respectively connected to one of said first and second computers and to said common transmission bus and each of which includes gate means for selectively passing a signal to the corresponding computer from said common transmission bus and a signal to be delivered from said corresponding computer to said common transmission bus; means including at least one first connection line for transmitting data or control signals and which connects said first computer to said first bus connector means; at least one second connection line for transmitting data or control signals and which connects said second computer to said second bus connector means; and a third connection line which connects said first computer to said second computer; said method performed in each computer independently comprising the steps of:*

*controlling said gate means in each of said first and second bus connector means by applying control signals from the respective computers to said bus connector means through the respective first and second connection lines;*

*transmitting data delivered from said first computer to said second computer through said first connection line, said first bus connector means, said common transmission bus, said second bus connector means and said second connection line; and*

*transmitting a signal for checking the operative condition of said first and second computers along a closed loop which includes said first computer, said third connection line, said second computer, said second connection line, said second bus connector means, said common transmission bus, said first bus connector means and said first connection line.*

*15. A method of controlling data transmission system having at least one transmission medium, and a plurality of equipments which are connected to said transmission medium and each of which has (1) connector means connected through said transmission medium to other equipments and including at least one gate means and (2) control means for controlling operation of said gate means, said method performed in each equipment at any time independently of the operations of and in parallel with other equipments including the steps of:*

*selectively passing a signal from one of the equipments to another one in at least one direction thereof via said transmission medium;*

*checking a path including at least one of said other equipments and said transmission medium connected thereto and producing a control signal when a fault is detected; and*

*controlling said gate means of said connector means by said control means in response to said control signal so as to prevent said signal from passing through at least one of said gate means when a fault is detected as a result of said checking step.*

*16. The method according to claim 15 in which said gate means includes means for selectively receiving a signal from one of said other equipments, and said controlling step comprises controlling said gate means of said connector means so as to prevent said signal receiving by said gate means when a fault is detected as a result of said checking step.*

*17. A data transmission system according to claim 15 or 16 wherein, a plurality of transmission mediums are connected to each of said plurality of equipments and in which said gate means includes means for selectively transmitting data to said transmission mediums, and wherein said controlling step includes controlling said gate means so that, when the fault of a path including one of said plurality of transmission medium is detected as a result of the checking step, said signal is transmitted to another one of said plurality of transmission mediums.*

*18. A data transmission system according to claim 15 in which said checking step includes sending a loop check message which passes a loop which comprises said one of the other equipments and said transmission medium connected thereto.*

*19. The method according to claims 14 or 15, in which respective steps in each equipment are performed in parallel with those in other equipment.*

*20. A method of controlling a multicomputer system having a plurality of equipments, each of which includes a computer and connecting means for transmission and reception of data, and a transmission medium connecting said equipments, said method comprising the following steps performed in each computer means in each equipment:*

*transmitting a signal for transmission request through said connecting means to said transmission medium;*

*receiving a signal for transmission request from at least one of the other equipments through said connecting means;*

*determining whether the computer has the right of data transmission based on signals for transmission request of its own equipment and from other equipment; and*

*transmitting data through said connecting means to said transmission medium when it has the right of data transmission;*

*wherein each equipment operates independently to each other and respective operations in each equipment are performed in parallel with those in each other equipment.*

*21. A multicomputer system comprising:*

*(a) first and second computers, each of which includes a processor for controlling transmission and reception of data;*

*(b) a transmission line;*

*(c) first and second connector means, which are respectively connected to said first and second computers and to said transmission line and each of which includes gate means, for selectively passing a signal to the corresponding computer from said transmission line and a signal to be delivered from said corresponding computer to said transmission line;*

*(d) means including at least one first connection line for transmitting data or control signals and which connects said first computer with said first connector means;*

*(e) means including at least one second connection line for transmitting data or control signals and which connects said second computer with said second connector means, said gate means in each of said first and second connector means being controlled by signals which are applied from the respective computers to said connector means through the respective first and second connection lines, and data delivered from said first computer being transmitted to said second computer through said first connection line, said first bus connector means, said transmission line, said second bus connector means and said second connection line; and*

*(f) means for transmitting a signal for checking the condition of said first and second computers along a route which includes said second computer, said second connection line, said second connector means, said transmission line, said first bus connector means, said first connection line and said first computer.*

* * * * *